United States Patent
Wieczorek et al.

(10) Patent No.: US 7,007,997 B1
(45) Date of Patent: Mar. 7, 2006

(54) REMOVABLE STANCHION COVER

(75) Inventors: Joseph P. Wieczorek, Lake Orion, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 11/035,063

(22) Filed: Jan. 12, 2005

(51) Int. Cl.
*B60N 2/04* (2006.01)

(52) U.S. Cl. .............. 296/65.03; 296/191; 296/193.07; 296/37.14

(58) Field of Classification Search ................ 296/191, 296/193.07, 63, 65.03, 37.14, 39.1
See application file for complete search history.

(56) References Cited

U.S. PATENT DOCUMENTS

| | | | |
|---|---|---|---|
| 3,317,238 A | 5/1967 | Smoll | |
| 3,669,817 A | 6/1972 | McDevitt | |
| 4,091,149 A | 5/1978 | Oxendine | |
| 4,944,612 A | 7/1990 | Abstetar et al. | |
| 4,946,216 A | 8/1990 | Demick | |
| 4,968,548 A | 11/1990 | Gibson et al. | |
| 4,979,772 A | 12/1990 | Carey et al. | |
| 5,083,831 A | 1/1992 | Foyen | |
| 5,215,345 A | 6/1993 | Orphan | |
| 5,322,335 A | 6/1994 | Niemi | |
| D381,230 S | 7/1997 | Gifford | |
| 5,649,684 A | 7/1997 | Denis et al. | |
| 5,673,956 A | 10/1997 | Emery | |
| 5,806,909 A | 9/1998 | Wise | |
| 5,914,169 A | 6/1999 | Brunetto | |
| 5,979,962 A | 11/1999 | Valentin et al. | |
| 6,017,074 A * | 1/2000 | Biskup | 296/39.1 |
| 6,047,940 A | 4/2000 | Kaplan | |
| 6,129,402 A | 10/2000 | Carriere | |
| 6,145,910 A | 11/2000 | Baldas et al. | |
| 6,224,962 B1 | 5/2001 | Young, III | |
| 6,286,886 B1 * | 9/2001 | Odagaki | 296/65.03 |
| 6,345,856 B1 * | 2/2002 | Minai | 296/65.03 |
| 6,419,315 B1 * | 7/2002 | Hiemstra | 296/65.03 |
| 6,527,154 B1 | 3/2003 | Larsen et al. | |
| 6,578,896 B1 | 6/2003 | Peterson | |
| 6,695,380 B1 * | 2/2004 | Hicks | 296/37.14 |
| 2003/0015531 A1 | 1/2003 | Choi | |
| 2004/0021331 A1 | 2/2004 | Mills | |
| 2005/0104402 A1 * | 5/2005 | Matsuoka et al. | 296/37.14 |

\* cited by examiner

*Primary Examiner*—Jason Morrow
(74) *Attorney, Agent, or Firm*—Raggio & Dinnin, P.C.

(57) ABSTRACT

A stanchion cover having an upholstered cover for providing a flat cargo surface in a sport utility vehicle or minivan in the area of removable or stowable seats. The cover also includes improvements in providing cargo storage compartments for common and safety accessories as well as providing ways to utilize the seat stanchions to provide cargo anchor for specific applications.

6 Claims, 2 Drawing Sheets

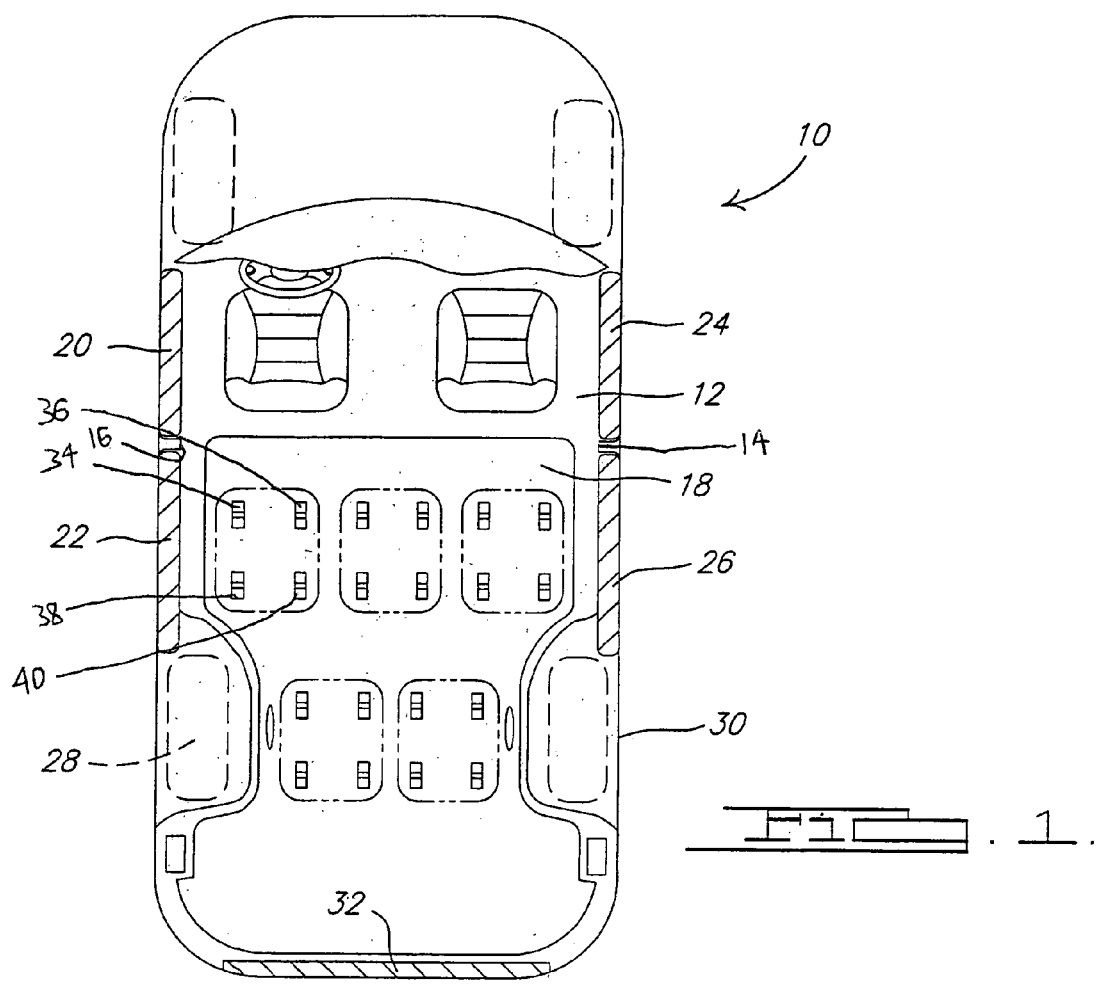
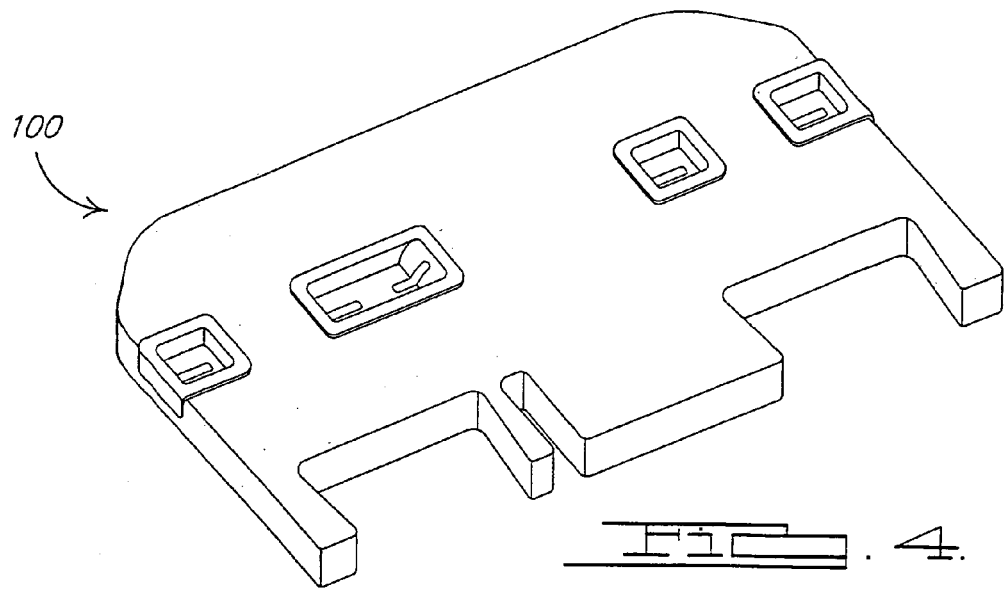

US 7,007,997 B1

REMOVABLE STANCHION COVER

This invention relates to covers for the interior portions of vehicles and more particularly to a stanchion cover to cover the area beneath rear seats in minivans or SUV's when the seats are in a folded position.

BACKGROUND OF THE INVENTION

Sport Utility Vehicles (SUV's) and minivans are extremely popular in the current automotive market. These vehicles provide seating for four or more passengers, but the rear seating typically can be removed or adjusted to provide for additional cargo space, thus increasing the utility of the vehicle. As the primary function of these vehicles is the transportation of passengers, typically families, the vehicles often are provided with amenities, such as carpeting and enhanced trim detail. As these vehicles are relatively expensive compared to passenger vehicles, and typically generate a higher profit, manufacturers can emphasis the luxury aspects of the vehicle. In order to provide adequate securing of the seats in the vehicle, substantial stanchions and latches are required to be placed in the interior of the vehicle which are exposed when these seats are folded or removed. Wherefore, there is a need in the art to provide a convenient, attractive and effective way of covering the area exposed when seats are folded or removed to provide an attractive and useful cargo surface.

SUMMARY OF THE INVENTION

It is an object of the present invention to provide attractive and useful stanchion cover that can be readily installed in the vehicle.

It is another object of the present invention to provide a method of manufacturing a stanchion cover which is low cost and provides a cover which can be easily produced to match interiors of vehicles.

It is another object of the present invention to provide a cover for vehicle floor panels for an interior, which cooperate with stanchions to provide anchoring or mounting for the storage of items such as bicycles, skis, animal cages or kennels and the like.

It is a further object of the present invention to provide a cover for the interior floor panel of the vehicle which provides compartments for the holding of articles such as cups or first aid kits.

It is a further object of the present invention to provide an interior floor panel for vehicles which has means for securing items to the vehicle floor.

It is a further object of the present invention to provide an interior floor panel cover for vehicles which have captain chairs which are removable or which may be folded into a storage position.

The above objects and other objects are realized in accordance with the present invention by a cover which is adapted to be located in a vehicle behind the driver's seat and front passenger seat. The cover is placed in an area occupied by one or more additional passenger seats which are mounted to the floor panel of the vehicle. Such additional passenger seats are either removably attached to the floor panel or are at least partially removably attached to the floor panel, such that the seats can be folded or rotated from a seating position into a storage position, the storage position uncovering one or more seat stanchions. The cover is generally an elongated panel adapted to be positioned on the vehicle floor so that the outer edges of the panels are adjacent the opposed side walls of the vehicle so as to provide an interrupted surface of which cargo can be supported.

In the preferred form of the invention, the panels are made of a plastic material and are preferably blow-molded. In the preferred form of the invention the panel is provided with a sewn, zippered cover, with a carpeted material on the upper portion which matches the carpet of the vehicle and a synthetic fabricated, non-woven material on the bottom.

It is preferred that the liner remain in the vehicle when the rear seats are in the unfolded position for accommodating passengers, thus eliminating the need to remove the cover unless so desired.

BRIEF DESCRIPTION OF THE DRAWINGS

Other objects, advantages and features of the present invention will be apparent to one that is skilled in the art from the following detailed description and drawings.

FIG. 1 is a perspective view of the stanchion cover according to the present invention. (top view).

FIG. 4 is a perspective view of the bottom side of the cover according to the present invention.

DETAILED DESCRIPTION OF THE INVENTION

Figure 2:
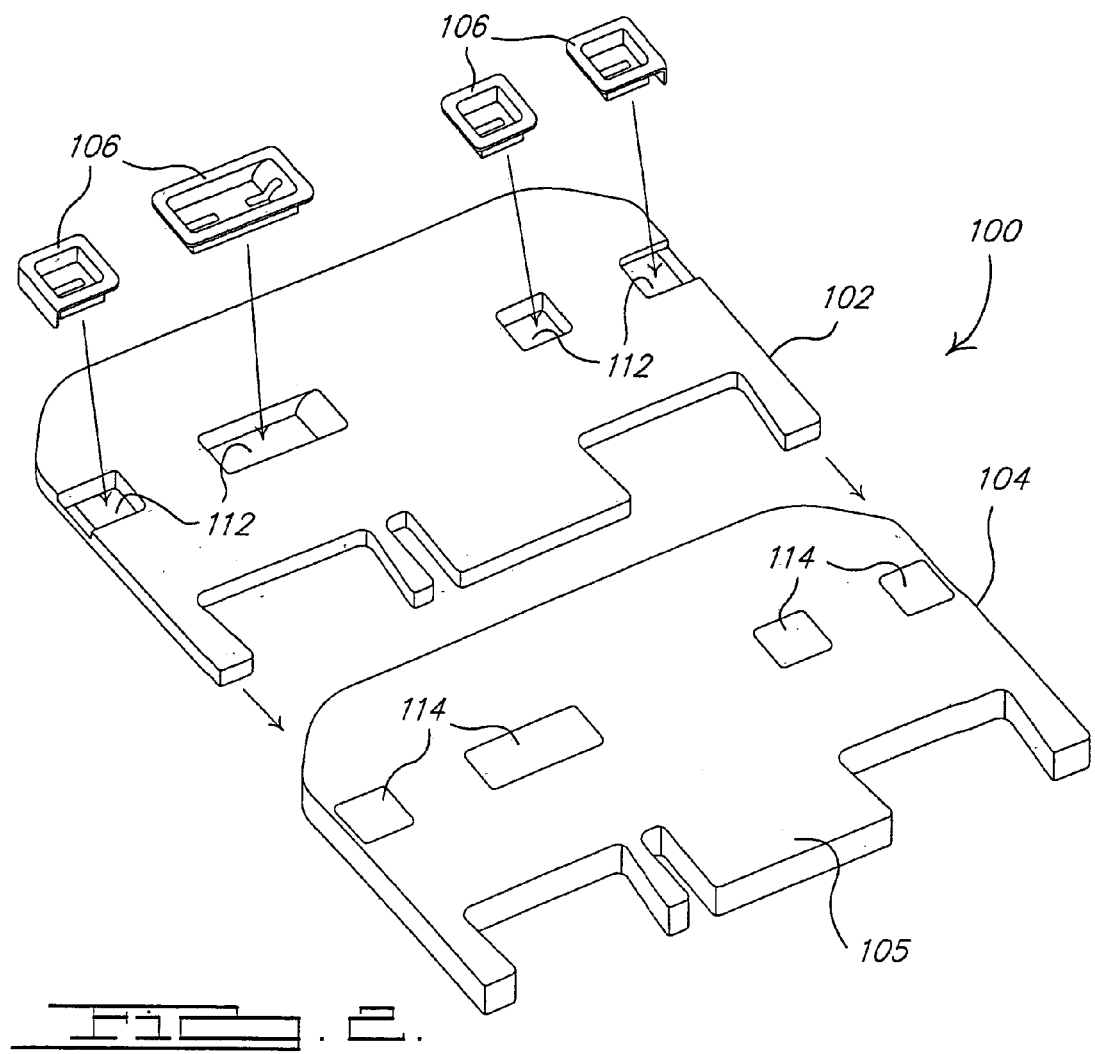
FIG. 2 is an exploded view of the present invention.

A vehicle 10 shown having a passenger compartment 12 having side panels 14 and 16 and a floor panel 18. The vehicle 10 typically has four doors, a driver's door 20, a left rear passenger door 22, a right front passenger door 24 and a right rear passenger door 26. Further, the vehicle side body is formed to define rear wheel housings 28, 30. And at the rear of the vehicle there is typically a tailgate 32 or lift gate or other type of door which permits cargo to be loaded into the vehicle.

The floor panel is typically sheet metal, which is provided with carpeting. However, there are points for anchoring the passenger seats to the car body which can not be carpeted. In particular, rear seats are typically anchored at least four points 34, 36, 38, 40. A variety of anchoring methods are used for rear seats to provide for different methods of providing for additional cargo room within the vehicle. In the preferred embodiment, seats are pivotally secured along their front lower edge to the floor panel and are releasably secured at their rear lower edge to stanchions. The point of releasable attachment may be a stanchion or any similar type of fastener member which can be used for sufficient support by the seat latches on the rear seats (not shown). Thus, the rear attachment portions of the seats may be released, and the seats folded forward to create additional space for cargo. Alternately, the arrangement may be such that all points of attachment for the seats are releasable such that the seats may be removed completely from the vehicle.

Although the floor panel of the vehicle is carpeted, elements of the seating mechanism extend above the surface of the floor panel which create an unsightly appearance and also can cause difficulty in sliding objects across the floor panel or even injury. In order to provide a flatter cargo surface, the stanchion cover of FIG. 2 is provided. The cover can be inserted to provide a smooth and flat surface when the seats are in their folded over stowed position. The panel is sufficiently thin that the seats may be locked in their passenger configuration on top of the panel. The panel is configured to a butt against each of the vehicle interior side walls so as to be secured for motion side to side, and is also configured to fit over the transmission hump in the floor board, which helps position and retain the cover in place.

Figure 3:
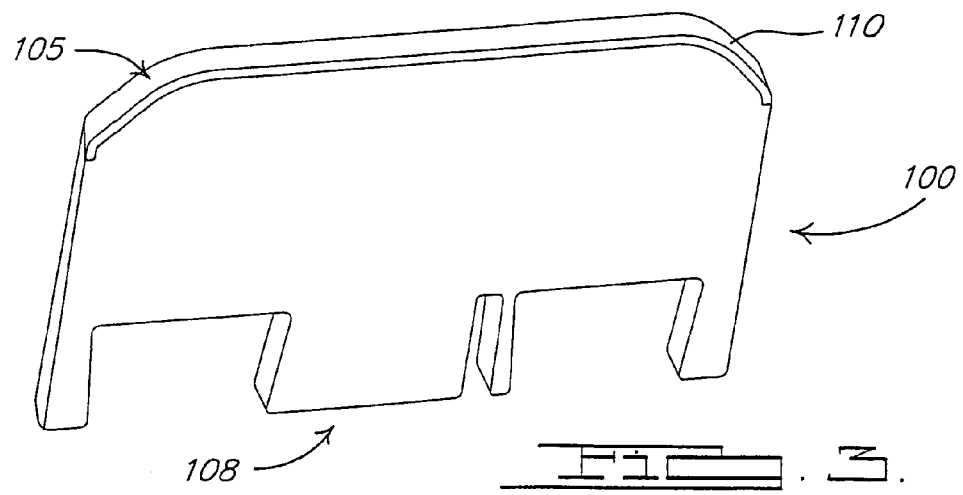
FIG. 3 is a perspective view of the top side of the cover according to the present invention.

FIGS. 2, 3 and 4 illustrate the present invention 100. The cover 100 is shaped to fit within a particular car body as exemplified in the Figures. The panel 102 and sleeve 104 are provided with openings to accept article carriers 106, preferably plastic bins. The remaining visible surfaces are provided with a carpeted appearance matching the vehicle interior by using a sleeve 104 having a carpeted portion 105. The sleeve preferably has a DEON backing material for the underside 108 which is durable, inexpensive, and sufficiently elastic to allow the sleeve to be tightly retained around the panel 102. A zipper 110 is provided to selectively open the sleeve to insert or remove the panel. The bins 106 are inserted through openings 114 in sleeve 104 and are configured to snap-fit into the opening 112 in the panel 102, thus providing a trimmed finish.

In an alternate embodiment the openings 112 and 114 may be designed to provide access to the vehicle seat stanchions to allow for the fastening or securing of various cargo such as luggage or animal carriers. Specific brackets can be used such as for bicycles. Trim pieces similar to the bins 106, but with no bottom, would preferably be used to secure the sleeve 104 around the openings 114.

The present description is for illustrative purposes only, and should not be construed to limit the scope of the present invention in any way. Thus, those skilled in the art will appreciate that various modifications could be made to the presently disclosed embodiments without departing from the intended spirit and scope of the invention. Other aspects, features and advantages will be apparent upon an examination of the attached drawing Figures.

What is claimed is:

1. A cover for a passenger vehicle having a passenger compartment having front seats and removable or stowable rear seats and a plurality of seat stanchions for releasably securing said seats in place, said passenger compartment having a width defined by the interior door and side panels of said vehicle, and having a floor well defined toward the rear of the vehicle by a planar cargo area, and lower than said cargo area, said cover comprising;

a molded plastic panel configured to fill said floor well the width of said passenger compartment between said cargo area and said front seats, forming a substantially level surface with said cargo area, said panel having apertures therethrough to receive a plurality of said stanchions; and a sleeve having at least one upholstered panel, formed to fit said plastic panel, said cover having apertures corresponding to said plastic panel apertures when said sleeve is secured about said plastic panel.

2. The cover of claim 1 wherein said sleeve comprises a fabric panel having elastic character.

3. The cover of claim 1 wherein said cover contains a utility compartment and said sleeve has an opening corresponding thereto.

4. The cover of claim 3 wherein said utility compartment press fits into a corresponding opening in said panel and clamps a portion of said sleeve in the vicinity of said sleeve opening against said panel.

5. The cover of claim 1 further comprising a bracket means for securing items stowed in said cargo area to said stanchions.

6. A cover for a passenger vehicle having a passenger compartment having front seats and removable or stowable rear seats and a plurality of seat stanchions for releasably securing said seats in place, said passenger compartment having a width defined by the interior door and side panels of said vehicle, and having a floor well defined toward the rear of the vehicle by a planar cargo area, and lower than said cargo area, said cover comprising;

a pair of molded plastic panels configured to fill said floor well the width of said passenger compartment between said cargo area and said front seats, forming a substantially level surface with said cargo area, said panels having apertures therethrough to receive a plurality of said stanchions; and a pair of sleeves having each at least one upholstered panel, formed to fit said plastic panels, said cover having apertures corresponding to said plastic panel apertures when said sleeves are secured about said plastic panels.

* * * * *

UNITED STATES PATENT AND TRADEMARK OFFICE
CERTIFICATE OF CORRECTION

| | | |
|---|---|---|
| PATENT NO. | : 7,007,997 B1 | Page 1 of 1 |
| APPLICATION NO. | : 11/035063 | |
| DATED | : March 7, 2006 | |
| INVENTOR(S) | : Wieczorek et al. | |

It is certified that error appears in the above-identified patent and that said Letters Patent is hereby corrected as shown below:

Col. 3, Line 1, - Please delete -- a butt -- and insert -- abut -- after configured to Signed and Sealed this First Day of August, 2006

JON W. DUDAS
*Director of the United States Patent and Trademark Office*